United States Patent [19]
Hasegawa

[11] Patent Number: 5,893,068
[45] Date of Patent: Apr. 6, 1999

[54] METHOD OF EXPANDING A FREQUENCY RANGE OF A DIGITAL AUDIO SIGNAL WITHOUT INCREASING A SAMPLING RATE

[75] Inventor: Satoshi Hasegawa, Tokyo, Japan

[73] Assignee: NEC Corporation, Tokyo, Japan

[21] Appl. No.: 829,753

[22] Filed: Mar. 31, 1997

Related U.S. Application Data

[63] Continuation-in-part of Ser. No. 254,046, Jun. 3, 1994, abandoned.

[30] Foreign Application Priority Data

Jun. 3, 1993 [JP] Japan .................................... 5-133067

[51] Int. Cl.⁶ ...................................................... G10L 7/00
[52] U.S. Cl. .......................................... 704/502; 704/205
[58] Field of Search ..................................... 704/205, 500, 704/502, 503, 200, 201, 206, 207, 208, 209, 258, 265, 266, 268, 269, 504

[56] References Cited

U.S. PATENT DOCUMENTS

| | | | |
|---|---|---|---|
| 4,182,930 | 1/1980 | Blackmer | 381/28 |
| 4,614,934 | 9/1986 | Kobayashi et al. | 341/144 |
| 4,700,390 | 10/1987 | Machida | 704/500 |
| 4,855,894 | 8/1989 | Asahi et al. | 363/157 |
| 5,075,880 | 12/1991 | Moses et al. | 361/724.1 |
| 5,267,095 | 11/1993 | Hasegawa et al. | 360/39 |
| 5,454,011 | 9/1995 | Shimoyoshi | 375/240 |

*Primary Examiner*—Richemond Dorvil
*Attorney, Agent, or Firm*—Laff, Whitesel, Conte & Saret, Ltd.

[57] ABSTRACT

A frequency range of a digital audio signal is expanded without increasing a sampling frequency $f_s$. The digital audio signal has a frequency range with an upper frequency defined by a frequency $f_s/2$, and also has noise components induced when being digitized. Firstly, the digital audio signal is split into first and second audio signals. The noise components of the first audio signal are shifted up to a predetermined frequency higher than $f_s$ so as to leave a first frequency range between the first audio signal and the noise components. Following this, the first audio signal is delayed by a predetermined time duration. On the other hand, the second audio signal is band-pass filtered such as to have a second frequency range defined by frequencies $f_1$ and $f_2$ wherein $0<f_1<f_2<f_s$. Subsequently, the second audio signal is Fourier transformed, after which the spectrum of the second frequency range is processed so as to be expanded over new spectrum. Thereafter, the second audio signal with the new spectrum is subjected to reverse-Fourier transformation. The delayed first digital audio signal is combined with the second audio signal which has been reverse-Fourier transformed, in a manner which incorporates the second audio signal into the first frequency range.

6 Claims, 3 Drawing Sheets

METHOD OF EXPANDING A FREQUENCY RANGE OF A DIGITAL AUDIO SIGNAL WITHOUT INCREASING A SAMPLING RATE

RELATED APPLICATION

This application is a continuation-in-part application of U.S. patent application Ser. No. 08/254,046 filed Jun. 3, 1994, now abandoned.

BACKGROUND OF THE INVENTION

1. Field of the Invention

The present invention relates generally to improvements in audio signal processing, and more specifically to a method of expanding a frequency range of a digital audio signal without increasing a sampling rate which has been utilized for converting an original analog audio signal to the digital audio signal.

2. Description of the Related Art

With the advent of recent developments in digital signal processing, it is often the case that an analog audio signal such as a speech signal is converted into a digital signal and then is stored, for later use, in an appropriate storage medium such a RAM (random access memory), a magnetic tape, etc.

Before turning to the present invention it is deemed advantageous to briefly discuss a known method wherein a digital audio signal stored in storage medium is read out thereof for driving a speaker after being converted into the corresponding analog signal.

FIG. 1 is a diagram schematically showing such a known technique. The arrangement of FIG. 1 includes a plurality of functional blocks together with three sketches each of which schematically illustrates spectrum distribution of a digital signal appearing at the functional blocks.

As shown in FIG. 1, an analog-to-digital (A/D) converter 10 is supplied with an analog signal such as a speech signal. The A/D converter 10 samples the incoming analog signal and then quantizes the sampled values as is well known in the art. A digital audio signal thus obtained in stored in a suitable storage medium 12 such as a RAM. Representing a sampling rate as $f_s$, a sampling theorem tells us that the digital signal stored in the storage medium 12 has a frequency spectrum (frequency range) extending from 0 Hz to $f_s/2$.

Therefore, if the A/D converter 10 samples the incoming audio signal at a sampling rate of 8 kHz, then the digital signal stored has a frequency spectrum ranging from 0 Hz to 4 kHz (=$f_s/2$). Further, the digital signal stored in the storage medium includes aliasing noises inherently incurred during the sampling, as is known in the art.

A digital audio signal retrieved from the storage medium 12 is applied to a digital signal processor 14. The spectrum of the digital signal is schematically shown in a sketch (A) of FIG. 1. As shown, the digital audio signal (hatched portion) has a frequency range from 0 Hz to $f_s/2$ and accompanying aliasing noises. The spectra of the digital signal and the noises are symmetrical with respect to the frequency $f_s/2$.

The digital signal processor 14 operates such as to shift the aliasing noises toward a higher frequency range. In other words, the processor 14 moves only the aliasing noises away from $f_s/2$. Thereafter, the output of the digital signal processor 14 is applied to a digital-to-analog converter 16 wherein the digital signal is converted into the corresponding analog. Subsequently, an analog low-pass filter 18 allows the audio signal (hatched portion) to pass therethrough. Thus, the aliasing noises can be blocked at the low-pass filter 18. The reproduced analog signal is applied to a speaker 22 via a speaker driver 20 which includes an audio frequency amplifier as is known in the art.

It has been assumed that the digital audio signal has the frequency range from 0 Hz to 4 kHz. If It is desired to reproduce a sound at the speaker 22 in a more natural manner, the frequency range of the stored digital signal should be expanded up to a higher frequency (for example, about 8 kHz). This implies that the sampling rate should be increased to 16 kHz (8 kHz×2).

It is sometimes desirable to expand an audio frequency range without increasing a sampling rate. However, no technique has been proposed for effectively expanding a digital audio frequency range without increasing a sampling rate.

SUMMARY OF THE INVENTION

It is therefore an object of the present invention to provide a method of expanding a frequency range of a digital audio signal without increasing a sampling rate which is used to convert an original analog signal into the digital audio signal In brief, the above object is achieved by techniques wherein a frequency range of a digital audio signal is expanded without increasing a sampling frequency $f_s$. The digital audio signal has a frequency range with an upper frequency defined by a frequency $f_s/2$, and also has noise components induced when being digitized. Firstly, the digital audio signal is split into first and second audio signals. The noise components of the first audio signal are shifted up to a predetermined frequency higher than $f_s$ so as to leave a first frequency range between the first audio signal and the noise components. Following this, the first audio signal is delayed by a predetermined time duration. On the other hand, the second audio signal is band-pass filtered such as to have a second frequency range defined by frequencies $f_1$ and $f_2$ wherein $0<f_1<f_2<f_s$. Subsequently, the second audio signal is Fourier transformed, after which the spectrum of the second frequency range is processed so as to be expanded over new spectrum. Thereafter, the second audio signal with the new spectrum is subjected to reverse-Fourier transformation The delayed first digital audio signal is combined with the second audio signal which has been reverse-Fourier transformed, in a manner which incorporates the second audio signal into the first frequency range.

More specifically, an aspect of the present invention resides in a method of A method of expanding a frequency range of a digital audio signal which has been sampled by a frequency $f_s$, the digital audio signal having a frequency range with an upper frequency defined by a frequency $f_s/2$, the digital audio signal having noise components induced when issuing the digital audio signal by an analog-to-digital conversion, the method comprising the steps of: (a) splitting the digital audio signal into first and second digital audio signals; (b) shifting the noise components of the first digital audio signal up to a predetermined frequency higher than $f_s$ so as to leave a first frequency range between the first digital audio signal and the noise components; (c) delaying the first digital audio signal by a predetermined time duration; (d) band-pass filtering the second digital audio signal which, after being subjected to the band-pass filtering, has a second frequency range defined by frequencies $f_1$ and $f_2$ wherein $0<f_1<f_2<f_s$; (e) Fourier transforming the second digital audio signal after being subjected to the band-pass filtering; (f)

expanding spectrum of the second frequency range of the second digital audio signal over spectrum which is defined by a third frequency range; (g) reverse-Fourier transforming the spectrum defined by the third frequency range; and (h) combining the first digital audio signal delayed in step (c) and the second digital audio signal after being reverse-Fourier transformed, in a manner which incorporates the second digital audio signal resulting from step (g) into the first frequency range for generating a third digital audio signal with an expanded frequency range.

BRIEF DESCRIPTION OF THE DRAWINGS

The feature and advantages of the present invention will become more clearly appreciated from the following description taken in conjunction with the accompanying drawings in which like members or elements are denoted by like reference numerals and in which.

DETAILED DESCRIPTION OF THE PREFERRED EMBODIMENTS

Figure 2:
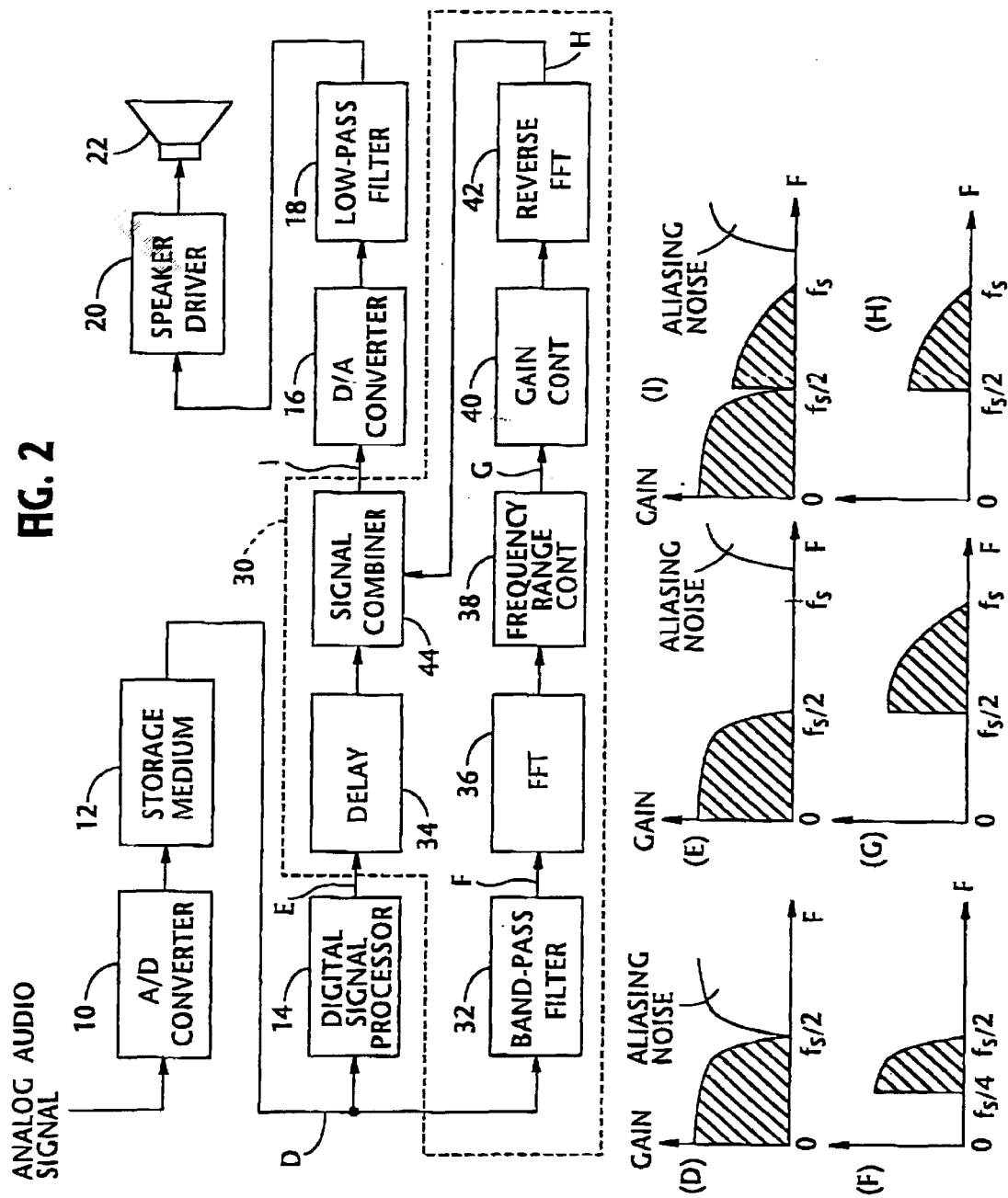
FIG. 2 is a diagram schematically showing a plurality of functional blocks and sketches provided for a better understanding of the present invention.
Figure 3:
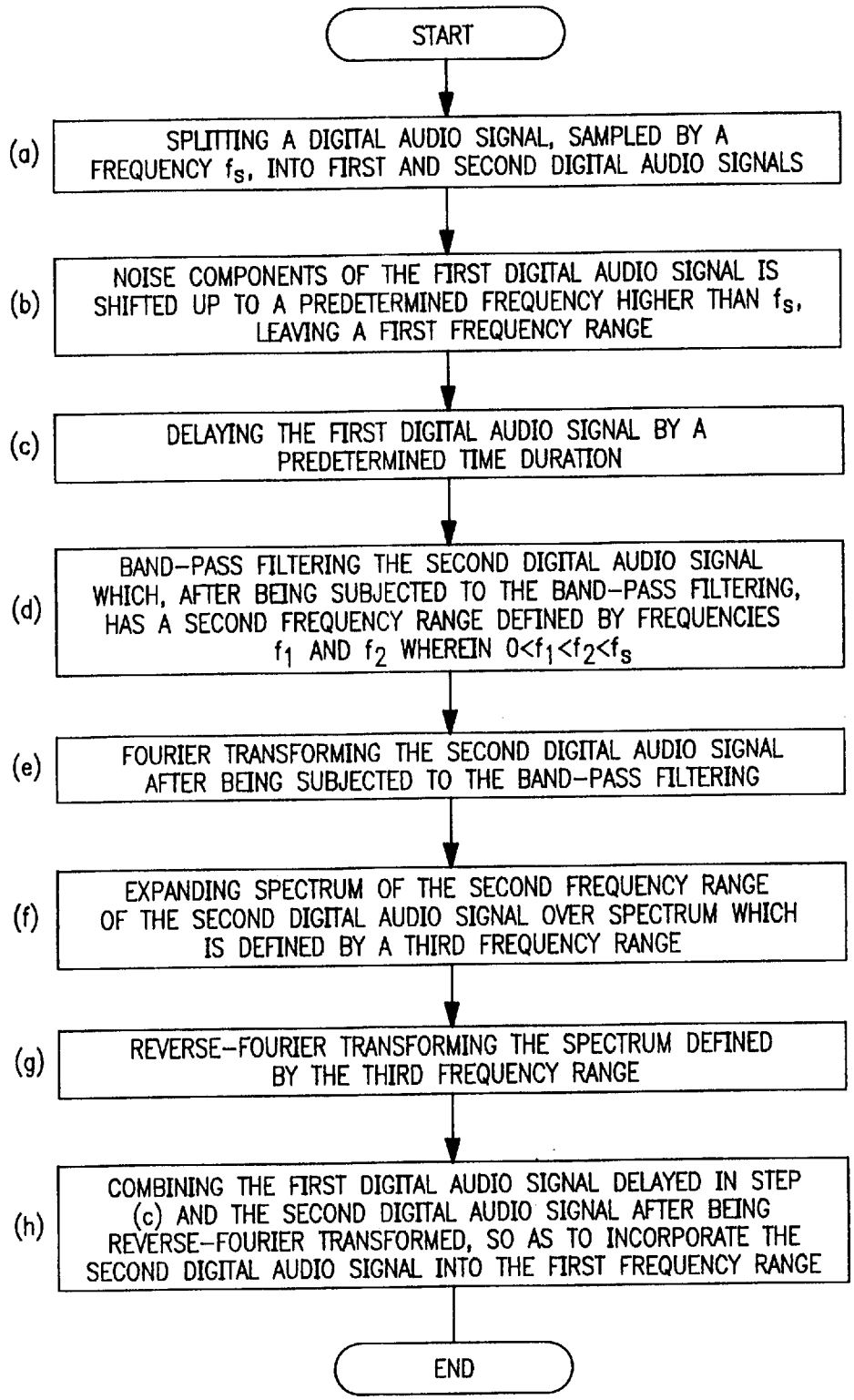
FIG. 3 is a flow chart of the claimed method.

Reference is now made to FIG. 2, wherein a plurality of functional blocks for use in discussing the present invention is shown. FIG. 2 further illustrates six sketches (D)–(I) each showing spectrum distribution of digital signal appearing at the blocks of FIG. 2.

Figure 1:
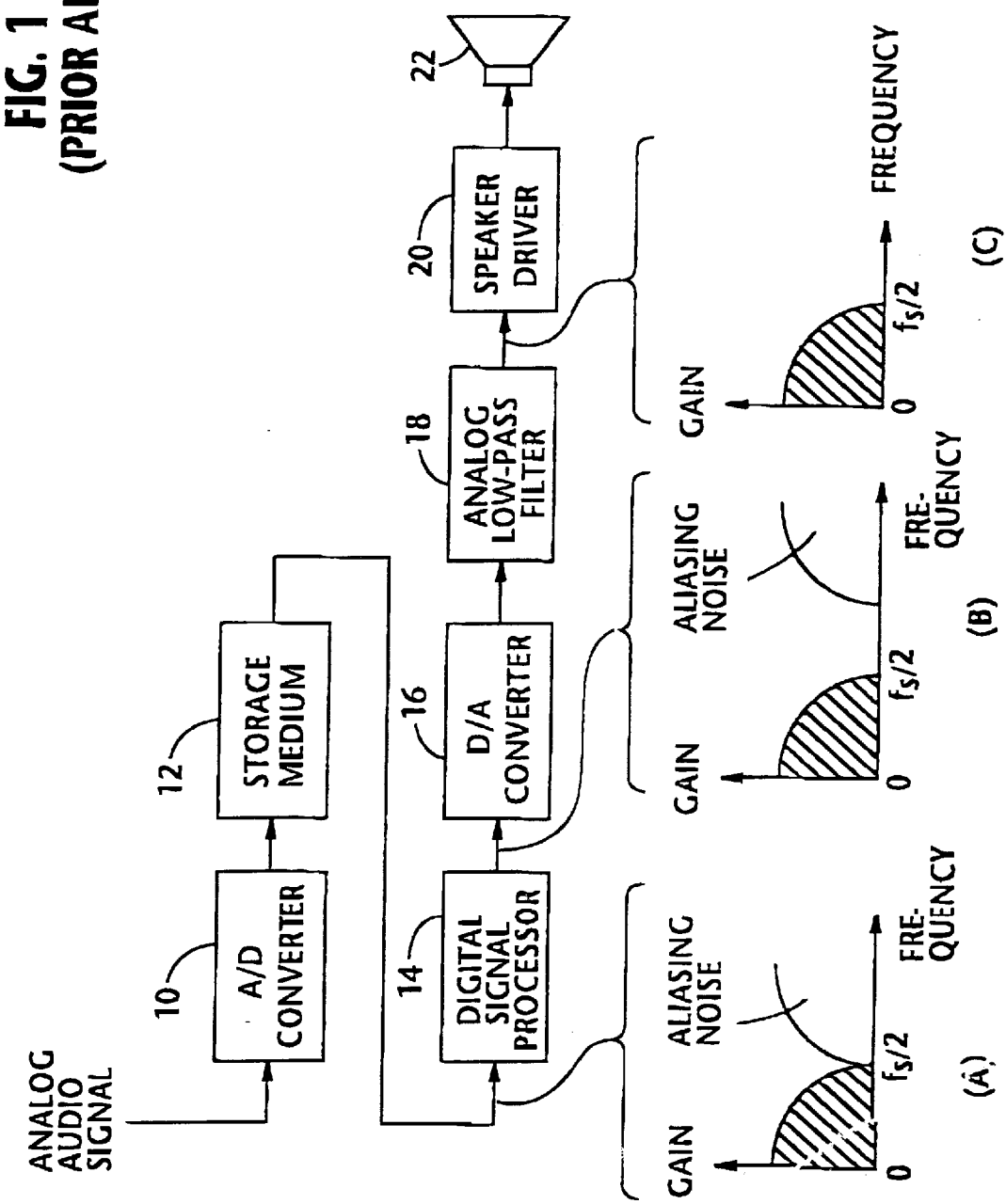
FIG. 1 is an illustration schematically showing a known audio signal processing technique, having referred to in the opening paragraphs of the instant disclosure.

The arrangement of the blocks of FIG. 2 differs from that of FIG. 1 in that the former arrangement further includes a frequency range expander 30 enclosed by a dashed line.

Each of the blocks of the frequency range expander 30 is well known to one of ordinary skill in the art. The present invention resides in an improved method that can be achieved by combining such known functional blocks.

As mentioned in connection with the prior art, a digital audio signal is stored in the storage medium 12 such as a RAM (random access memory), a magnetic tape, etc. Further, the sampling rate $f_S$ at the A/D converter 10 is 8 kHz merely by way of example. Thus, as before, the digital signal stored in the storage medium 12 has a frequency range from 0 Hz to 4 kHz ($=f_S/2$).

In FIG. 2, the sketches (D)–(I) show spectrum distribution of corresponding digital signals D–I, respectively.

The digital audio signal D is retrieved from the storage medium 12 and then is applied to both the digital signal processor 14 and a band-pass filter 32 which forms part of the frequency range expander 30.

The spectrum of the digital signal D, which is shown in the sketch (D), is substantially the same as that shown in the sketch (A) of FIG. 1.

As in the prior art of FIG. 1, the digital signal processor 14 operates such as to shift the aliasing noises toward a higher frequency range. In this case, the aliasing noises are shifted above the sampling frequency $f_S$ as illustrated in the sketch (E). Thereafter, the output of the processor 14 is applied to a delay circuit 34. The delay circuit 34 is to delay the digital audio signal D by a time duration that is required for processing a digital signal at blocks 32, 36, 38, 40, and 42.

The band-pass filter 32 is to filter signal components between $f_S/4$ and $f_S/2$ of the digital signal D, as shown in the sketch (F).

The output F of the band-pass filter 32 is then applied to a FFT (Fast Fourier Transformer) 36. That is, the FFT 36 changes the output F from time domain to frequency domain in order to effectively process the output F in the following two stages. A frequency range controller 38 receives the output of the FFT 36 and expands the frequency spectrum ranging from $f_S/4$ to $f_S/2$ to a new frequency spectrum ranging from $f_S/2$ to $f_S$. Thus, the output (depicted by G) of the frequency range controller 38 exhibits a frequency spectrum as shown in the sketch (G). This expansion of frequency spectrum is carried out by treating or dealing with the values between $f_S/4$ and $f_S/2$ as new corresponding values between $f_S/2$ and $f_S$, respectively.

However, merely expanding the spectrum at the block 38 undesirably induces lack or deficiency of data when implementing a reverse operation at a reverse FFT 42. In other words, such data deficiency caused by the spectrum expansion may lead to poor reproduction of the original audio signal. Therefore, new data are filled using a known interpolation technique after the above mentioned spectrum expansion.

Following this, the output G of the frequency range controller 38 is applied to a gain controller 40. This controller 40 operates such as to regulate the signal gain over the frequency range (from $f_S/2$ to $f_S$) of the signal G in order to improve the sense of hearing when the reproduced analog signal drives the speaker 22. As is well known in the art, the response of a human ear to sound depends on the frequency of the sound as well as its intensity. The ear is more sensitive to some frequencies than to others. The ear is most sensitive near 4 kHz. At frequencies other than this, the sound must be made more intense before it is audible. The gain controller 40 is to regulate the audio signal gains of the digital signal applied from the controller 38 to appropriate levels.

Subsequently, the output of the gain controller 40 is restored to a time domain signal using the reverse FFT 42. The spectrum of the output H of the reverse FFT 42 is schematically shown in the sketch (H).

The operation of the FFT 36 and the reverse FFT 42 are known in the art and hence further discussion thereof will be omitted for brevity.

A signal combiner 44 is supplied with the two outputs of the delay circuit 34 and the reverse FFT 42, and combines them as shown in the sketch (I). As mentioned above, the delay circuit 34 is to retard the output E of the digital signal processor 14 by a time duration which is required for completing the signal processing at the reverse FFT 42.

Thus, the output I of the signal combiner 44 has a frequency range extending from 0 Hz to 8 kHz (viz., corresponding to the sampling rate $f_S$) in this particular case.

The D/A converter 16 converts the digital output I into the corresponding analog signal. The low-pass filter 18 is designed such as to pass the analog signal components from 0 Hz to 8 kHz (viz., $f_S$) and to block the aliasing noises. Thus, a more natural sound can be obtained from the speaker 22 compared with the prior art without increasing the sampling frequency $f_S$.

A goal of the present invention is to expand the frequency range of the output F of the filter 32 and then combine the delayed digital signal and the output H of the reverse FFT 42. Accordingly, it is understood that the present invention is in no way limited to the aforesaid filtered bandwidth ranging from $f_S/4$ to $f_S/2$. That is, such a band-pass filtering is merely exemplary.

According to the present invention, the spectrum expansion and gain regulation (spectrum shaping) are implemented in the frequency domain using simple digital signal processing as mentioned above. Therefore, the present invention exhibits marked advantages over the corresponding analog signal processing wherein a large number of very complex processes are inevitable and a lengthy, cumbersome software is necessary.

It will be understood that the above disclosure is representative of only one possible embodiment of the present invention and that the concept on which the invention is based is not specifically limited thereto.

What is claimed:

1. A method of expanding a frequency range of a digital audio signal which has been sampled by a frequency $f_s$, said digital audio signal having a frequency range with an upper frequency defined by a frequency $f_s/2$, said digital audio signal having noise components induced when issuing said digital audio signal by an analog-to-digital conversion, said method comprising the steps of:

(a) splitting said digital audio signal into first and second digital audio signals;

(b) shifting the noise components of said first digital audio signal up to a predetermined frequency higher than $f_s$ so as to leave a first frequency range between said first digital audio signal and said noise components;

(c) delaying said first digital audio signal by a predetermined time duration;

(d) band-pass filtering said second digital audio signal which, after being subjected to the band-pass filtering, has a second frequency range defined by frequencies $f_1$ and $f_2$ wherein $0<f_1<f_2<f_s$;

(e) Fourier transforming said second digital audio signal after being subjected to the band pass filtering; (f) expanding spectrum of said second frequency range of said second digital audio signal over spectrum which is defined by a third frequency range;

(g) reverse-Fourier transforming the spectrum defined by said third frequency range; and (h) combining said first digital audio signal delayed in step (c) and said second digital audio signal after being reverse-Fourier transformed, in a manner which incorporates said second digital audio signal resulting from step (g) into said first frequency range for generating a third digital audio signal with an expanded frequency range.

2. A method as claimed in claim 1, wherein said predetermined time duration corresponds to a time duration for which said second digital audio signal resulting from step (g) is incorporated at step (h) into said first digital audio signal delayed in step (c) after said digital audio signal is split in step (a).

3. A method as claimed in claim 1, further comprising,
   regulating gains of frequency components of said second digital audio signal after step (f), said second digital audio signal with gains which have been regulated being reverse-Fourier transformed in step (g).

4. A method as claimed in claim 1, wherein said frequency $f_1$ is equal to $f_s/4$ and wherein said frequency $f_2$ is equal to $f_s/2$.

5. A method as claimed in claim 1, wherein said second frequency range is defined by said frequencies $f_s/2$ and $f_s$.

6. A method as claimed in claim 1, further comprises the steps of:
   converting said third digital audio signal into a corresponding analog signal after said step (h); and
   low-pass filtering said analog signal so as to block said noise components.

* * * * *